United States Patent
Wells et al.

(10) Patent No.: US 12,316,632 B2
(45) Date of Patent: May 27, 2025

(54) TRANSFERRING VERIFIABLE ADDRESS RIGHTS BETWEEN DEVICES OF A DATA CENTER (DC) NETWORK

(71) Applicant: Cisco Technology, Inc., San Jose, CA (US)

(72) Inventors: Ian James Wells, San Jose, CA (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 626 days.

(21) Appl. No.: 17/335,292

(22) Filed: Jun. 1, 2021

(65) Prior Publication Data

US 2022/0385662 A1 Dec. 1, 2022

(51) Int. Cl.
*H04L 9/40* (2022.01)
*H04L 61/5007* (2022.01)
*H04L 101/622* (2022.01)

(52) U.S. Cl.
CPC .......... *H04L 63/10* (2013.01); *H04L 61/5007* (2022.05); *H04L 2101/622* (2022.05)

(58) Field of Classification Search
CPC ... H04L 63/10; H04L 63/0807; H04L 9/3213; H04L 63/02; H04L 63/0209; H04L 63/0227; H04L 63/0236; H04L 9/3247; H04L 9/00; H04L 9/14; H04L 9/0861; H04W 12/08; H04W 12/084; G06F 21/10; G06F 21/71; G06F 21/64
See application file for complete search history.

(56) References Cited

U.S. PATENT DOCUMENTS

| | | | | |
|---|---|---|---|---|
| 9,860,324 B1* | 1/2018 | Roskind | ................ | H04L 67/141 |
| 10,348,767 B1* | 7/2019 | Lee | ......................... | H04L 45/54 |
| 10,430,225 B1* | 10/2019 | Harland | .............. | G06F 9/45558 |
| 10,484,334 B1* | 11/2019 | Lee | ......................... | H04L 67/30 |
| 11,128,464 B1* | 9/2021 | Loladia | .............. | H04L 63/0807 |
| 11,615,403 B1* | 3/2023 | Thandapani | .......... | H04L 9/3213 |
| | | | | 705/67 |
| 2011/0075674 A1 | 3/2011 | Li et al. | | |
| 2015/0341318 A1* | 11/2015 | Lee | ......................... | H04L 63/20 |
| | | | | 726/11 |
| 2016/0308825 A1 | 10/2016 | Jain et al. | | |
| 2019/0288859 A1 | 9/2019 | Reddy et al. | | |
| 2020/0274977 A1 | 8/2020 | Tani | | |
| 2020/0344058 A1* | 10/2020 | Wang | .................. | H04L 63/0807 |
| 2021/0019194 A1 | 1/2021 | Bahl et al. | | |

* cited by examiner

*Primary Examiner* — Kevin Bechtel
*Assistant Examiner* — Sayeda Salma Nahar
(74) *Attorney, Agent, or Firm* — Lee & Hayes, P.C.

(57) ABSTRACT

Techniques for transferring address rights (e.g., internet protocol address(es), media access control address(es), etc.) amongst devices in a data center network fabric. A data center (DC) authority (e.g., network controller and/or a service controller) of a data center network fabric may determine that a device in the network is to communicate on an address in the network. The DC authority may create and sign a token that indicates a verifiable authorization to communicate on the address. The token may allow any device that posses the token to communicate on the address, following verification from an associated network switch. Additionally, the token may be signed by a device in the network in possession of the token, and delegated to another device in the data center network fabric following a migration of a service from one server to another, for example.

20 Claims, 7 Drawing Sheets

300 ⟶

```
┌─────────────────────────────────────────────────────────────────┐
│  RECEIVE A TOKEN AT A FIRST DEVICE IN A DATA CENTER FABRIC, THE │
│  TOKEN COMPRISING A VERIFIABLE INDICATION OF AUTHORIZATION TO   │
│  COMMUNICATE ON AN ADDRESS IN THE DATA CENTER FABRIC            │
│                              302                                │
└─────────────────────────────────────────────────────────────────┘
                                │
                                ▼
┌─────────────────────────────────────────────────────────────────┐
│  SEND ONE OR MORE PACKETS FROM THE FIRST DEVICE TO A SECOND     │
│  DEVICE IN THE DATA CENTER FABRIC, THE ONE OR MORE PACKETS      │
│  INCLUDING THE TOKEN INDICATING THE AUTHORIZATION TO            │
│  COMMUNICATE ON THE ADDRESS                                     │
│                              304                                │
└─────────────────────────────────────────────────────────────────┘
                                │
                                ▼
┌─────────────────────────────────────────────────────────────────┐
│       COMMUNICATE, BY THE FIRST DEVICE, DATA ON THE ADDRESS     │
│                              306                                │
└─────────────────────────────────────────────────────────────────┘
```

FIG. 3

TRANSFERRING VERIFIABLE ADDRESS RIGHTS BETWEEN DEVICES OF A DATA CENTER (DC) NETWORK

TECHNICAL FIELD

The present disclosure relates generally to transferring address rights (e.g., internet protocol address(es), media access control address(es), etc.) amongst devices in a data center network fabric.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. Users may be allocated portions of the computing resources using virtualization technology that remain available for peak demands of the users. The virtualized portions, or virtualized networks, of computing resources may be scaled up (or down) according to the computing needs of a given user without the need to maintain excess computing capacity.

To support a service (or application) using cloud computing, various types of schedulers are utilized to automate deployment, scaling, and operations of the virtual computing resources (or "virtual resources") across physical servers in a cloud computing network. To effectively orchestrate the virtual resources, the schedulers may track what virtual resources have been placed on what physical servers in order to determine where to spin up or migrate virtual resources. For example, a scheduler may determine that the resource utilization of a physical server has increased, and the physical server may be unable to support one or more virtual resources deployed to the physical server. The scheduler may then identify an additional physical server that has availability of server resources to adequately support the virtual resource. The virtual resource may then be migrated and deployed to the other physical server that has availability to support the virtual resource. However, migration of a virtual resource from one physical server to another may lead to difficulties routing communications between virtual resources executing on separate physical servers.

To effectively manage migration of virtual resources across a number of physical servers, a switch may be utilized to forward packets to virtual services that are deployed on the physical servers. When a virtual resource is migrated from a source server to destination server, the virtual resource may begin sending data from a new address, and a respective switch may transmit an advertisement message to various switches in a data center fabric alerting each of such a migration. While advertising the migration is advantageous for various reasons, there is no validation of the addresses that are exchanged between hosts, resources, and/or devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for a first device in a data center fabric to receive a token comprising a verifiable indication of authorization to communicate on an address in the fabric, send one or more packets comprising the token to a second device in the data center fabric, and communicate on the address.

DESCRIPTION OF EXAMPLE EMBODIMENTS

Overview

Figure 1A:
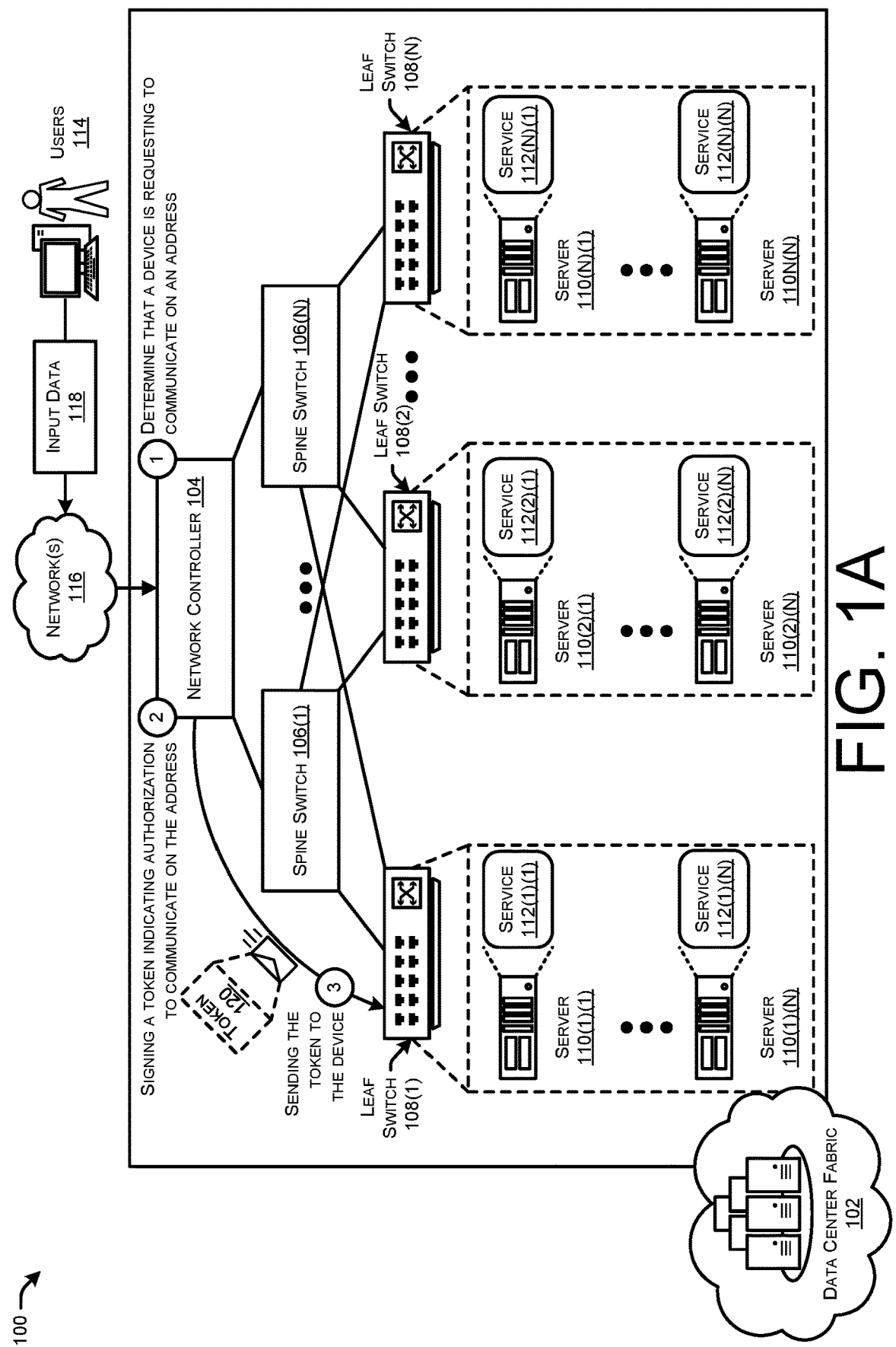
FIG. 1A illustrates a system-architecture diagram of an example flow for transferring address rights (e.g., internet protocol address(es), media access control address(es), etc.) amongst devices in a data center network fabric. A network controller of the data center fabric may determine that a device is requesting to communicate on an address in the network, sign a token indicating authorization to communicate on the address, and send the token to the device.

This disclosure describes a method for a network controller (or a service controller) associated with a data center fabric network to determine that a device in the data center fabric is requesting to communicate on an address, sign a token indicating authorization to communicate on the address, and send the token to the device allowing the device to communicate on the address in the data center fabric using the signed token. The method includes determining, by a network controller associated with a data center fabric, that a device in the data center fabric is requesting to communicate on an address in the data center fabric. Additionally, or alternatively, the method includes signing a token indicating authorization to communicate on the address. Additionally, or alternatively, the method includes sending the token to the device.

Additionally, or alternatively, the method includes receiving a token at a first device in a data center fabric, the token comprising a verifiable indication of authorization to communicate on an address in the data center fabric. Additionally, or alternatively the method includes sending one or more packets from the first device to a second device in the data center fabric, the one or more packets including the token indicating the authorization to communicate on the address. Additionally, or alternatively, the method includes communicating, by the first device, data on the address.

Additionally, the techniques described herein may be performed by a system and/or device having non-transitory computer-readable media storing computer-executable instructions that, when executed by one or more processors, performs the method described above.

Example Embodiments

The usefulness of virtual resources offered by data centers has resulted in a rapid increase in cloud computing offering a wide range of services that may be fined-tuned to meet a user's needs. For example, a scheduler may determine that the resource utilization of a physical server has increased, and the physical server may be unable to support one or more virtual resources deployed to the physical server. The scheduler may then identify an additional physical server that has availability of server resources to adequately support the virtual resource. The virtual resource may then be migrated and deployed to the other physical server that has availability to support the virtual resource. However, migration of a virtual resource from one physical server to another may lead to difficulties routing communications between virtual resources executing on separate physical servers. To effectively manage migration of virtual resources across a number of physical servers in a data center fabric network, a switch may be utilized to forward packets to virtual services that are deployed on the physical servers. When a virtual resource is migrated from a source server to destination server, the virtual resource may begin sending data from a new address, and a respective switch may transmit an advertisement message to various switches in a data center fabric alerting each of such a migration. While advertising the migration is advantageous for various reasons, there is no validation of the addresses that are exchanged between hosts, resources, and/or devices.

Additionally, when the addresses a server is running are known, access control lists (ACLs) and/or policies may be applied in the fabric to ensure that that server, and only that server, can send data using the address. This is useful from a security perspective and in preventing software managing teams from affecting each other through destructive accidental events, e.g., spoofing. However, applying these ACLs and/or policies may be difficult with the movement of addresses about the data center network fabric.

This disclosure describes techniques to generate and transfer verifiable address rights (e.g., internet protocol (IP) address(es), media access control (MAC) address(es), etc.) amongst devices in a data center network fabric. For example, in a data center network fabric, a server may have one IP and/or MAC address (e.g., if the server is running an operating system) or the server may have a fixed and known set of IP and/or MAC addresses (e.g., if the server is executing virtual machine(s) (VM)). A host, executing on a server and/or supporting a service, may begin to utilize a new IP and/or MAC address for various reasons, such as, for example, a new VM boots up, the server is running a portion of a service chain and routing packets, or a VM has migrated. In some examples, a device and/or service in the data center network fabric may generate and/or issue a token that represents the right to send data from a specific IP and/or MAC address. For example, when a new service and/or VM starts up, a node (e.g., a switch) delegated to a server in which the service and/or VM is operating, may receive a token comprising a verifiable indication of authorization to communicate on an address in the data center fabric. The switch may then send one or more packets, including the token, to a second device in the data center fabric (e.g., another switch). Then, the switch may then begin to communicate data on the address on behalf of the service and/or VM. Additionally, or alternatively, a device and/or service in the data center network fabric, such as, for example, a network controller and/or a service controller, may determine that a device in the data center fabric is requesting to communicate on an address in the data center network fabric. The network controller, service controller, and/or any other network device in the fabric may then generate and/or sign a token indicating authorization to communicate on the address. In some examples, the token may be signed by a private key of the possessing device and/or component. The network controller and/or service controller may then send the token to the device requesting to communicate on the address.

Take, for example, a VM or a service starting up on a first server in a data center (DC) network fabric. A DC authority (e.g., a network controller) may receive an indication of such a startup from a first switch associated with the first server on which the service is operating. Additionally, or alternatively, the first switch may send a request to the DC authority to communicate on an IP address (or an IP address range) in the DC network fabric. Additionally, or alternatively, the switch may send the request to the DC authority to communicate on a specific MAC address in the DC network fabric. As such, the DC authority may determine that the first switch is requesting to communicate on the address in the DC network fabric. In some examples, the address may be configured as an IP address. Additionally, or alternatively, the address may be configured as a MAC address.

The DC authority may then create a token indicating that any switch in possession of this token has the right to transmit packets from the IP address. In some examples, the DC authority may then sign the token indicating the authorization to communicate on the address. Additionally, or alternatively, the DC authority may send the token to a service controller associated with the DC network fabric. Additionally, or alternatively, the DC authority may be configured to store and/or manage the tokens without the assistance of a separate service controller.

Next, the DC authority may cause the first switch to block the IP address range on all of the associated ports. In some examples, the DC authority may cause the first switch to block the address range on all of the ports prior to the service starting up on the first server. At this point, traffic from the host (e.g., the first server) on this IP address range may be forbidden.

Once the service starts up, a pool of IP addresses may be assigned to the service. In some examples, the DC authority may assign the pool of IP addresses to the service. Additionally, or alternatively, the service controller may assign the pool of IP addresses to the service. From here, the token for the address range may be passed from the DC authority and/or the service controller over the link that is configured to host the IP address.

The host may then pass the token to the first switch, the DC authority, and/or the service controller, where the first switch (or the DC authority or the service controller) may validate the token. In some examples, the first switch may validate the token using various validation techniques, such as, for example, a crypto signature check and/or a validation of a reference against a database entry, or the like.

The first switch may then be configured to open the access control lists (ACLs) for the IP range on the port and/or the bond going to the host to permit data being sent from the IP address. Additionally, or alternatively, the first switch may inform other devices in the DC network fabric (e.g., additional switches) that other uses of the token, and therefore the IP address, have been revoked. In some examples, the first switch may be configured to inform the other devices directly. Additionally, or alternatively, the first switch may be configured to inform the other devices by employing the assistance of the DC authority.

At this point, the host may now send from the address range matching the token. As such, incoming traffic to an address in the address range is received at the host, as the first switch is aware that the host has this address range and has the authorized validation to communicate on the address range. The host may then send the traffic into the service.

The tokens described herein may be configured such that they may only be active in one location (e.g., one switch) at a time. Additionally, or alternatively, the tokens may be configured such that they may be active in several locations, such as, for example, in equal-cost multi-path routing (ECMP) implementations, where the address is in several locations simultaneously.

Additionally, or alternatively, the service may migrate from the first server in the DC network fabric to a second server in the DC network fabric. In some examples, a second switch associated with the second server may send a request for the token to the first switch. In such examples, the first switch may perform a token delegation to the second switch. The first switch may perform the token delegation in various ways, such as, for example, a transfer of some or all rights associated with the token or a duplication of some or all rights associated with the token and subsequent transfer of the duplicated rights. In some examples, the token delegation may be configured as a simple transfer of the data (e.g., the token) from the first switch to the second switch, and the token may be configured such that whoever has a copy can utilize it. Additionally, or alternatively, the token delegation may be configured as a cryptographic operation where information may be added and/or replaced in the token, while the token remains covered by a signature indicating the validity of the token. In any of the examples previously described, the token delegation procedure may be performed utilizing the DC authority (e.g., the DC authority may reissue the token to a desired location and/or revoke a token from a previous location) and/or may be performed by asking the locally connected device (e.g., the first switch) to reissue the token and specifying any additional information to include in the token. Additionally, or alternatively, such token delegation methods may include explicit token revocation instructions, such that, when the token is utilized (e.g., transmitted with a packet), the DC authority may revoke any rights associated with the token on the previous host and/or at any other host included in the DC network fabric.

As described herein, a computing-based and/or cloud-based solution and/or service can generally include any type of resources implemented by virtualization techniques, such as containers, virtual machines, virtual storage, and so forth. Further, although the techniques described as being implemented in data center fabrics and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to transferring addresses (e.g., IP address, MAC address, etc.) amongst hosts, services, and/or devices in a data center network fabric. For instance, the techniques described herein create and sign a token that indicates validated rights to send from a specified address. By encapsulating the validated rights to send from the specified address in the token, the rights can be delegated from one machine to another in a data center network fabric, allowing for a data center authority to apply address restrictions automatically to new services that spin up in the data center network fabric, resulting in an increased scalability. Additionally, or alternatively, by encapsulating the validated rights in the token, the rights can be seamlessly delegated from one device to another following migration of a service from one location to another.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example flow 100 for transferring address rights (e.g., internet protocol address(es), media access control address(es), etc.) amongst devices in a data center network fabric 102. A network controller 104 of the data center fabric 102 may determine that a device is requesting to communicate on an address in the network 102, sign a token indicating authorization to communicate on the address, and send the token to the device.

The data center fabric 102 may comprise one or more data centers that include various networking devices, such as, spine network switches 106A-N, leaf network switch(es) 108(1)-(N), and physical servers 110(1)(1)-(N)(N), where N is any integer greater than "1." In some examples, the data center(s) may be located across geographic areas, and the data center fabric 102 may be a distributed network through which users (often customers) may interact via user devices to manage or otherwise interact with service provided by the data center network fabric 102.

The data center network fabric 102 may provide on-demand availability of computing system resources of physical server(s) 110, such as data storage, computing power (e.g., CPU, GPU, etc.), networking, databases, etc., without direct active management by users. In some examples, the data center network fabric 102 may be managed and maintained by a service provider such that users do not have to invest in and maintain the computing infrastructure for their computing resource needs. Generally, a user may be provided access to, or allocated use of, a portion of the computing resources of physical server(s) 110 in the data center network fabric 102. The data center network fabric 102 may scale, such as by spinning up resources or spinning down resources, based on demand for the individual users. The portions of the data center network fabric 102 may be allocated using hardware virtualization such that portions of the data center network fabric 102 can be configured and managed by the user (e.g., security configuration, load balancing configuration, etc.). However, the data center network fabric 102 need not be managed by a service provider, and can be managed by any entity, including the user themselves that run the applications or services.

In some examples, physical server(s) 110 may host one or more virtual machines. Each virtual machine may be configured to execute one of various operations and act as one or more virtual components for the cloud computing network 102, such as, for example, a service 112(1)(1)-(N)(N) where N is any integer greater than "1." In some examples, the physical server(s) 110 may host any number of virtual machines.

Generally, the number of services 112 may scale based on a number of users 114 interacting with the cloud computing network. The users 114 may comprise one or more of individual users, groups of users, organizations, businesses, or other entities that interact with the data center network fabric 102 via respective user devices. The user devices may be any type of computing device capable of connecting to the data center network fabric 102 via a suitable data communications network 116 such as, but not limited to, a laptop or desktop computer, a tablet computing device, a server computer, a television, or a mobile telephone. Administrative users employed by the operator of the data center network fabric 102, such as administrators managing the operation of the data center network fabric 102, might also connect with, manage, and utilize resources provided by the data center network fabric 102 in a similar fashion.

The users 114 may provide input data 118 via the network(s) 116 to interact with the service 112 that is supported by the virtual machines running on the servers 110. For example, the users 114 may submit requests to process data, retrieve data, store data, and so forth such that virtual machines hosting the services 112 are spun up or spun down to process the requests based on demand.

In some examples, the data center network fabric 102 may generate and transfer verifiable address rights (e.g., internet protocol (IP) address(es), media access control (MAC) address(es), etc.) amongst devices in the data center network fabric 102. For example, in a data center network fabric 102, a server 110 may have one IP and/or MAC address (e.g., if the server is running an operating system) or the server 110 may have a fixed and known set of IP and/or MAC addresses (e.g., if the server is executing virtual machine(s) (VM)). A host, executing on a server 110 and/or supporting a service 112, may begin to utilize a new IP and/or MAC address for various reasons, such as, for example, a new VM boots up, the server 110 is running a portion of a service chain and routing packets, or a VM has migrated.

In some examples, a device 110, component (e.g., the network controller 104), and/or service 112 in the data center network fabric 102 may generate and/or issue a token 120 that represents the right to send data from a specific IP and/or MAC address. For example, when a new service 110 and/or VM starts up, a node (e.g., a switch 108) delegated to a server 110 in which the service 112 and/or VM is operating, may receive a token 120 comprising a verifiable indication of authorization to communicate on an address in the data center fabric 102. The switch 108 may then send one or more packets, including the token, to a second device (e.g., another switch 108 and/or server 110) in the data center fabric 102. Then, the switch 108 may then begin to communicate data on the address on behalf of the service 112 and/or VM. Additionally, or alternatively, a device and/or service in the data center network fabric 102, such as, for example, a network controller 104 and/or a service controller, may determine that a device in the data center fabric 102 is requesting to communicate on an address in the data center network fabric 102. The network controller 104 and/or service controller may then generate and/or sign a token 120 indicating authorization to communicate on the address. The network controller 104 and/or service controller may then send the token 120 to the device requesting to communicate on the address.

Take, for example, a VM or a service 112(1)(1) starting up on a first server 110(1)(1) in a data center (DC) network fabric 102. A DC authority (e.g., a network controller 104) may receive an indication of such a startup from a first switch 108A associated with the first server 110(1)(1) on which the service 112(1)(1) is operating. Additionally, or alternatively, the first switch 108(1) may send a request to the DC authority 104 to communicate on an IP address (or an IP address range) in the DC network fabric 102. Additionally, or alternatively, the first switch 108(1) may send the request to the DC authority 104 to communicate on a specific MAC address in the DC network fabric 102.

The tokens 120 described herein may be configured such that they may only be active in one location (e.g., one switch) at a time. Additionally, or alternatively, the tokens 120 may be configured such that they may be active in several locations, such as, for example, in equal-cost multi-path routing (ECMP) implementations, where the address is in several locations simultaneously.

At "1," the DC authority 104 may determine that the first switch 108(1) is requesting to communicate on the address in the DC network fabric 102. In some examples, the address may be configured as an IP address. Additionally, or alternatively, the address may be configured as a MAC address. As such, it should be appreciated that any of the process(es) described herein may be performed with respect to an IP address and/or a MAC address of a device 110 and/or service 112 in the data center network fabric 102.

In some examples, at "2," the DC authority 104 may then create a token 120 indicating that any switch 106, 108 in possession of this token has the right to transmit packets from the IP address. In some examples, the DC authority 104 may then sign the token 120 indicating the authorization to communicate on the address. In some examples, the DC authority 104 may sign, or otherwise verify and/or authorize the token 120 using a private key and/or public key value. the DC authority may send the token to a service controller associated with the DC network fabric. Additionally, or alternatively, the DC authority may be configured to store and/or manage the tokens without the assistance of a separate service controller.

At "3," the DC authority may send the token 120 to the first switch 108(1) which is configured to route data to and from the servers 110(1)(1)-110(1)(N) and/or the services 112(1)(1)-112(1)(N). For example, the DC authority 104 may send the token 120 to the first switch 108(1) configured to transmit data including the service 112(1)(1) executing on the server 110(1)(1).

Figure 1B:
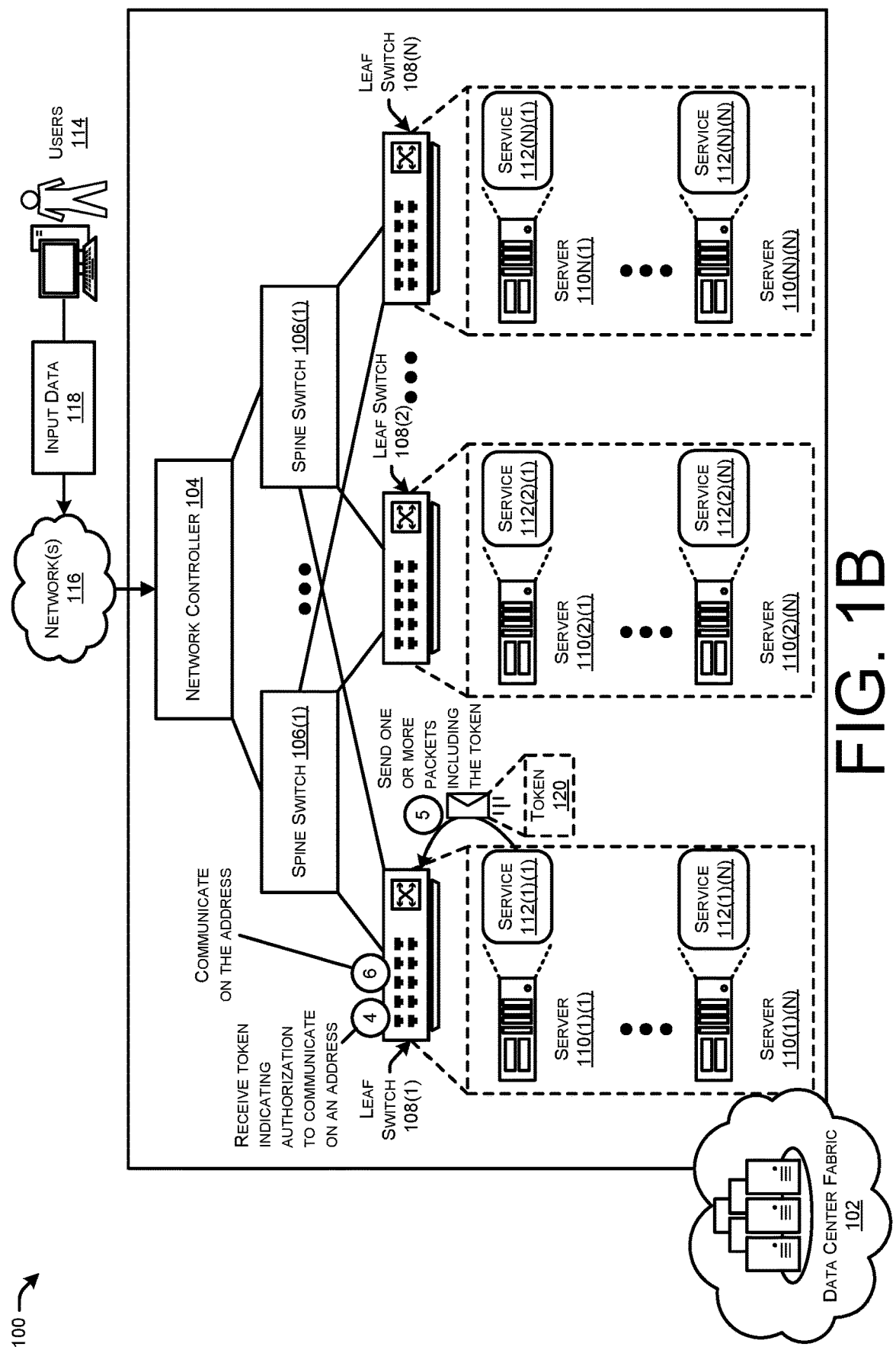
FIG. 1B illustrates a system-architecture diagram of an example flow for transferring address rights (e.g., internet protocol address(es), media access control address(es), etc.) amongst devices in a data center network fabric. A device (e.g., a switch) of a data center fabric may receive a token indicating authorization to communicate on an address in the network, send one or more packets including the token to a second device in the data center fabric, and may communicate on the address.

In some examples, the example flow may continue from step "3" of FIG. 1A to step "4" of FIG. 1B. Additionally, or alternatively, the example flow may begin from step "4" of FIG. 1B and continue from step "6" of FIG. 1B to step "1" of FIG. 1A. Additionally, or alternatively, the example flow from FIG. 1A may be executed simultaneously with the example flow of FIG. 1B.

FIG. 1B illustrates a system-architecture diagram of an example flow for transferring address rights (e.g., internet protocol address(es), media access control address(es), etc.) amongst devices in a data center network fabric 102. A device (e.g., a switch 108) of a data center fabric 102 may receive a token indicating authorization to communicate on an address in the network, send one or more packets including the token 120 to a second device in the data center fabric 102, and may communicate on the address.

At "4," the first switch 108(1) may receive the token 120 from the DC authority 104. Additionally, or alternatively, the first switch 108(1) may receive the token 120 from one or more additional switch(es) 108(1)-108(N) included in the data center fabric 102. In some examples, the token 120 may comprise an indication of an address, such as, for example, a MAC address and/or an IP address, and/or a verifiable authorization to communicate on the address. As previously mentioned, the token 120 may be signed by a public key and/or private key of the DC authority 104 and/or the switch 108 from which the token was received. In some examples, the first switch 108(1) may pass along the token 120 to the service 112(1)(1) and/or the first server 110(1)(1) supporting the service 112(1)(1). Additionally, or alternatively, the DC authority 104 may transmit the token 120 directly to the service 112(1)(1) and/or the first server 110(1)(1) supporting the service 112A(1).

At "5," the first server 110(1)(1) and/or the service 112(1)(1) may send one or more packets to the first switch 108(1). In some examples, the one or more packets may include the token 120. The first switch 108(1) may receive the token 120 and validate the token 120, that is, the first switch 108(1) may decrypt the token 120 using a public key of the network controller 104 and/or the switch 108 from which the token 120 was received.

At "6," the service 112(1)(1), the first server 110(1)(1), and/or the first switch 108(1) may be configured to communicate on the address. That is, the service 112(1)(1), the first server 110(1)(1), and/or the first switch 108(1) may be configured to transmit data to and from an additional service 112, an additional server 110, and/or an additional switch 108 such that the address indicated by the token supports the communication. In some examples, the first switch 108(1) may open the access control list (ACL) for the address range indicated by the token 120.

Additionally, or alternatively, the service 112(1)(1) may migrate from the first server 110(1)(1) in the DC network fabric 102 to a second server 110(2)(1) in the DC network fabric 102. In some examples, a second switch 108(2) associated with the second server 110(2)(1) may send a request for the token 120 to the first switch 108(1). In such examples, the first switch 108(1) and/or the first server 110(1)(1) may perform a token delegation to the second switch 108(2) and/or the second server 110(2)(1). The first switch 108(1) may perform the token delegation in various ways, such as, for example, a transfer of some or all rights associated with the token 120 or a duplication of some or all rights associated with the token 120 and subsequent transfer of the duplicated rights.

In some examples, the token delegation may be configured as a simple transfer of the data (e.g., the token 120) from the first switch 108(1) to the second switch 108(2), and the token 120 may be configured such that whatever device has a copy can utilize it. Additionally, or alternatively, the token delegation may be configured as a cryptographic operation where information may be added and/or replaced in the token 120, while the token remains covered by a signature indicating the validity of the token, such as, for example, a signature using the private key of the device from which the token 120 is migrating from (e.g., the first switch 108(A) and/or the first server 110(1)(1). In any of the examples previously described, the token delegation procedure may be performed utilizing the DC authority 104 (e.g., the DC authority 104 may reissue the token 120 to a desired location and/or revoke a token 120 from a previous location) and/or may be performed by asking the locally connected device (e.g., the first switch 108(1)) to reissue the token 120 and specifying any additional information to include in the token 120. Additionally, or alternatively, such token delegation methods may include explicit token revocation instructions, such that, when the token 120 is utilized (e.g., transmitted with a packet), the DC authority 104 may revoke any rights associated with the token 120 on the previous host and/or at any other host included in the DC network fabric 102.

Figure 2:
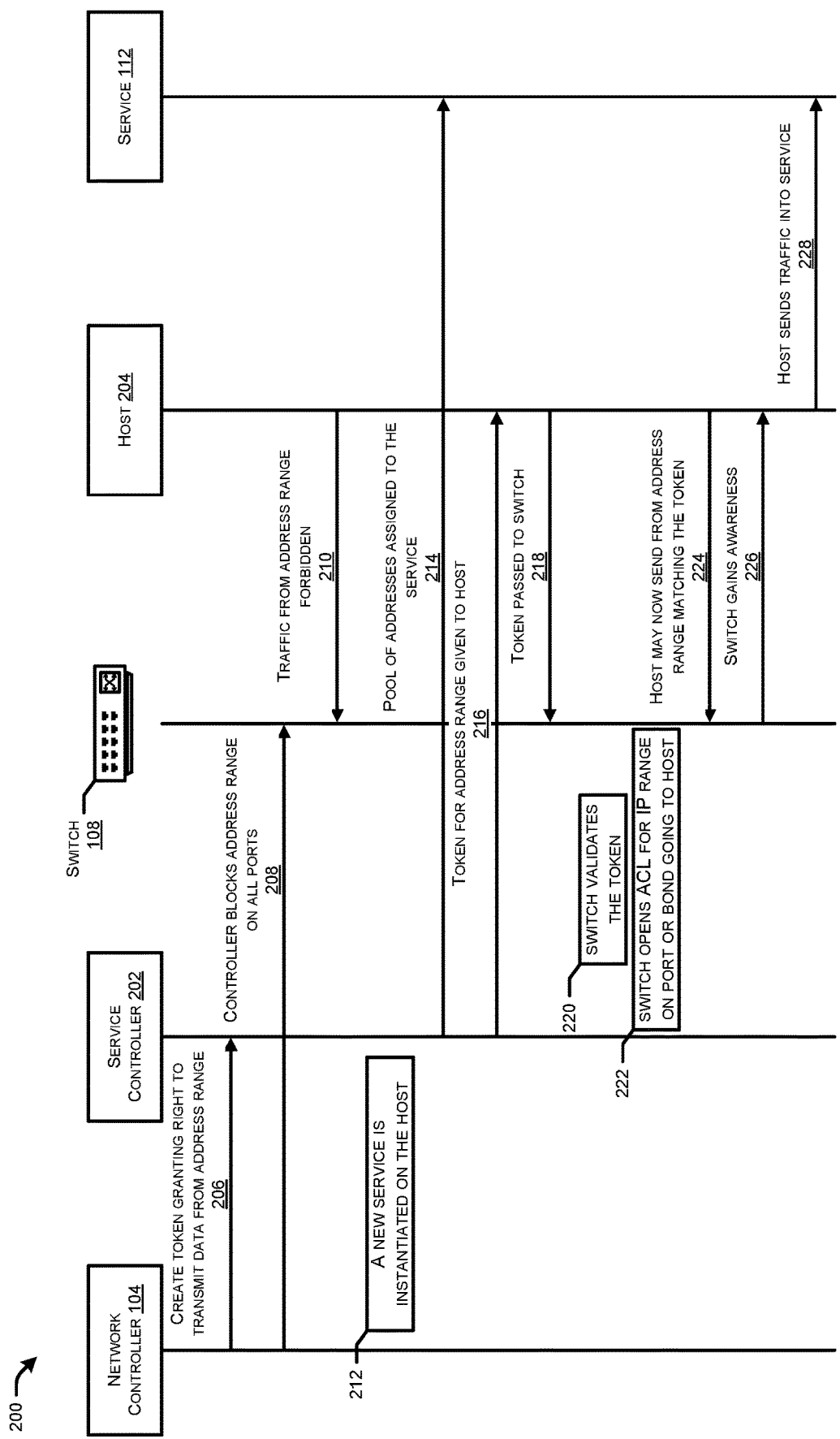
FIG. 2 illustrates a data flow diagram of an example process according to which address rights (e.g., internet protocol address(es), media access control address(es), etc.) may be transferred between devices in a data center network fabric.

FIG. 2 illustrates a data flow diagram of an example process 200 according to which address rights (e.g., internet protocol address(es), media access control address(es), etc.) may be transferred between devices in a data center network fabric 102. As previously mentioned, the data center network fabric 102 may include a network controller 104, one or more switch(es) 106, 108, one or more physical servers 110 supporting one or more virtual services 112, a service controller 202, and/or one or more host(s) 204.

At 206, the process 200 may include creating a token indicating that any switch in possession of this token has the right to transmit packets from the IP address. In some examples, the DC authority 104 and/or the service controller 202 may create the token. In some examples, the DC authority 104 and/or the service controller 202 may then sign the token indicating the authorization to communicate on the address. Additionally, or alternatively, the DC authority 104 may send the token to a service controller 202 associated with the DC network fabric 102. Additionally, or alternatively, the DC authority 104 may be configured to store and/or manage the tokens without the assistance of a separate service controller 202.

At 208, the DC authority may cause the first switch to block the IP address range on all of the associated ports. In some examples, the DC authority 104 may cause a first switch to block the address range on all of the ports prior to a service starting up on a first server, while a service starts up on a first server, and/or after the service has started up on a first server. At 210, traffic from the host 204 (e.g., the first server) on this IP address range may be forbidden.

At 212, a new service may be instantiated on the host 204. In some examples, the service may be configured as any one of the service(s) 112 described with respect to FIGS. 1A and 1B. The DC authority 104 and/or the service controller 202 may be notified that such a service has been instantiated.

At 214, a pool of IP addresses may be assigned to the service. In some examples, the DC authority 104 may assign the pool of IP addresses to the service. Additionally, or alternatively, the service controller 202 may assign the pool of IP addresses to the service. At 216, the token for the address range may be passed from the DC authority 104 and/or the service controller 202 over the link that is configured to host the IP address.

At 218, the host 204 may then pass the token to the first switch, the DC authority 104, and/or the service controller 202, where the first switch (or the DC authority or the service controller) may validate the token. At 220, the first switch may validate the token using various validation techniques, such as, for example, a crypto signature check and/or a validation of a reference against a database entry, or the like.

At 222, the first switch may then be configured to open the access control lists (ACLs) for the IP range on the port and/or the bond going to the host 204 to permit data being sent from the IP address. Additionally, or alternatively, the first switch may inform other devices in the DC network fabric 102 (e.g., additional switches) that other uses of the token, and therefore the IP address, have been revoked. In some examples, the first switch may be configured to inform the other devices directly. Additionally, or alternatively, the first switch may be configured to inform the other devices by employing the assistance of the DC authority 104 and/or the service controller 202.

At 224, the host 204 may now send from the address range matching the token. As such, at 226, following validation of the token, the first switch may gain awareness that the host 204 has this address range and has the authorized validation to communicate on the address range. As such, incoming traffic to an address in the address range is received at the host 204 from the first switch. At 228, the host 204 may then send the traffic into the service.

Figure 4:
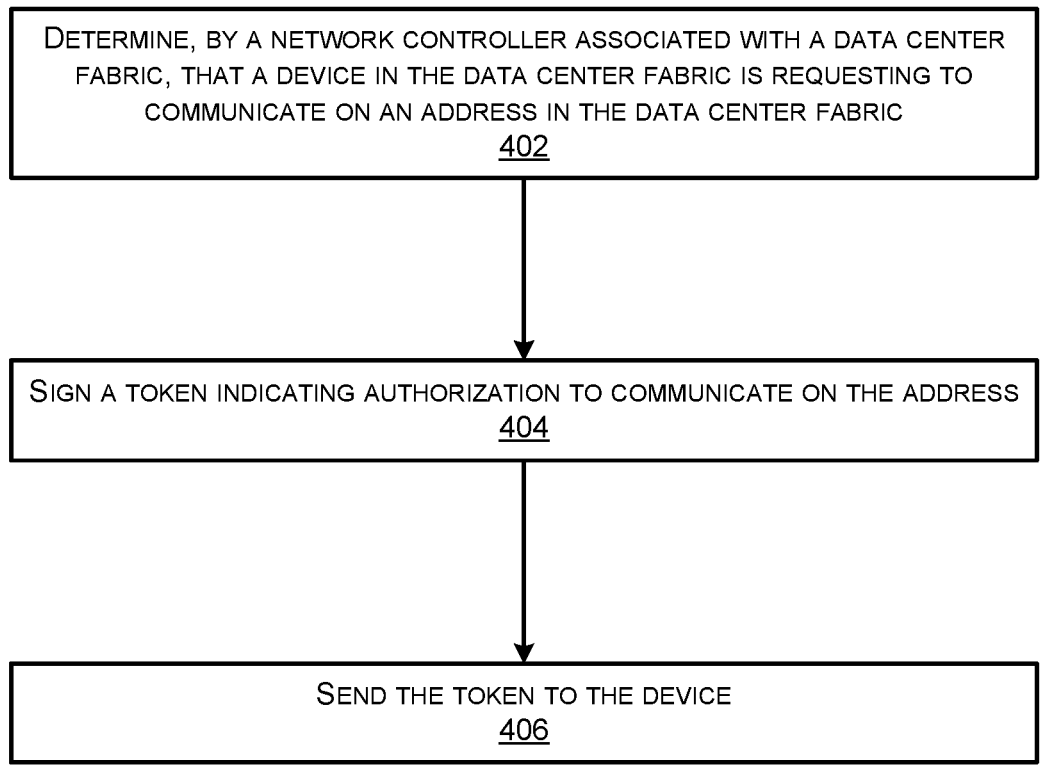
FIG. 4 illustrates a flow diagram of an example method for a network controller associated with a data center fabric to determine that a device in the data center fabric is requesting to communicate on an address, sign a token indicating authorization to communicate on the address, and send the token to the device.

FIGS. 3 and 4 illustrate flow diagrams of example methods 300 and 400 and that illustrate aspects of the functions performed at least partly by the data center fabric 102, the network controller 104, and/or the service controller 202 as described in FIGS. 1A, 1B, and 2. The logical operations described herein with respect to FIGS. 3 and 4 may be implemented (1) as a sequence of computer-implemented acts or program modules running on a computing system and/or (2) as interconnected machine logic circuits or circuit modules within the computing system. In some examples, the method(s) 300 and 400 may be performed by a system comprising one or more processors and one or more non-transitory computer-readable media storing computer-executable instructions that, when executed by the one or more processors, cause the one or more processors to perform the method(s) 300 and 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a first device in a data center fabric 102 to receive a token comprising a verifiable indication of authorization to communicate on an address in the fabric, send one or more packets comprising the token to a second device in the data center fabric, and communicate on the address.

At 302, the method 300 may include receiving a token at a first device in a data center fabric. In some examples, the token may comprise a verifiable indication of authorization to communicate on an address in the data center fabric 102. In some examples, the token may be configured as the token 120 as described with respect to FIGS. 1A-2.

At 304, the method 300 may include sending one or more packets from the first device to a second device in the data center fabric 102. In some examples, the one or more packets may include the token indicating the authorization to communicate on the address. In some examples, the first device may be configured as the first server 110(1)(1) and the second device may be configured as the first switch 108(1) as described with respect to FIGS. 1A-2.

At 306, the method 300 may include communicating, by the first device, data on the address. In some examples, a service executing on the first device may communicate the data on the address. In some examples, the service and/or the first device may send communication data to the second device, where the second device may be configured to route the communication data to additional devices in the data center network fabric 102.

Additionally, or alternatively, the method 300 may include receiving the token from a network controller 104 associated with the data center fabric 102. In some examples, the token may be signed using the private key of the network controller 104.

Additionally, or alternatively, the method 300 may include signing the token using the private key of the first device to generate a signed token. In some examples, sending the one or more packets may include sending the signed token.

Additionally, or alternatively, the method 300 may include determining that the address is to be migrated to at least one of a different device or a different service. In some examples, the first device may determine that the address is to be migrated. Additionally, or alternatively, the method 300 may include signing, by the first device, an indication that the address is to be migrated to at least one of the different device or the different service. Additionally, or alternatively, the method 300 may include sending the indication into the data center fabric.

Additionally, or alternatively, the method 300 may include determining, by the first device, that the address is to be migrated to at least one of a different device or a different service. Additionally, or alternatively, the method 300 may include signing, by the first device, an indication that the address is to be migrated to at least one of the different device or the different service. Additionally, or alternatively, the method 300 may include sending the token to at least one of the different device or the different service.

Additionally, or alternatively, the method 300 may include sending, to one or more devices associated with the data center fabric, an indication that the authorization to communicate on the address has been transferred to at least one of the different device or the different service.

In some examples, the address may comprise at least one of an internet protocol (IP) address or a media access control (MAC) address.

FIG. 4 illustrates a flow diagram of an example method 400 for a network controller 104 associated with a data center fabric 102 to determine that a device in the data center fabric 102 is requesting to communicate on an address, sign a token indicating authorization to communicate on the address, and send the token to the device.

At 402, the method 400 may include determining that a device in the data center fabric 102 is requesting to communicate on an address in the data center fabric 102. In some examples, a network controller 104 associated with a data center fabric 102 may determine that the device in the data center fabric 102 is requesting to communicate on the address. In some examples, the device may be configured as the first server 110(1)(1) or the first switch 108(1) as described with respect to FIGS. 1A-2.

At 404, the method 400 may include signing a token indicating authorization to communicate on the address. Additionally, or alternatively, the method 400 may include creating the token by the network controller 104. In some examples, the token may comprise a verifiable indication of authorization to communicate on an address in the data center fabric 102. In some examples, the token may be configured as the token 120 as described with respect to FIGS. 1A-2.

At 406, the method 400 may include sending the token to the device. In some examples, the token may be sent from the network controller 104 to the first device. Additionally, or alternatively, the token may be sent from an additional device included in the data center network fabric 102 and to the first device.

In some examples, the address may comprise at least one of an internet protocol (IP) address or a media access control (MAC) address.

Additionally, or alternatively, the method 400 may include receiving a request from the device to transfer the authorization to communicate on the address to an additional device in the data center fabric. Additionally, or alternatively, the method 400 may include signing an additional token indicating authorization to communicate on the address. Additionally, or alternatively, the method 400 may include sending the additional token to the additional device.

Additionally, or alternatively, the method 400 may include receiving a request from the device to transfer the authorization to communicate on the address to an additional device in the data center fabric. Additionally, or alternatively, the method 400 may include sending, to one or more devices associated with the data center fabric, an indication that the authorization to communicate on the address is to be transferred from the device to the additional device.

In some examples, signing the token may comprise signing the token using a private key of the network controller.

Additionally, or alternatively, the method 400 may include determining, by the network controller, that the address is to be migrated to at least one of a different device or a different service. Additionally, or alternatively, the method 400 may include signing, by the network controller, an indication that the address is to be migrated to at least one of the different device or the different service. Additionally, or alternatively, the method 400 may include sending the indication into the data center fabric. Additionally, or alternatively, the method 400 may include sending the token to at least one of the different device or the different service.

Figure 5:
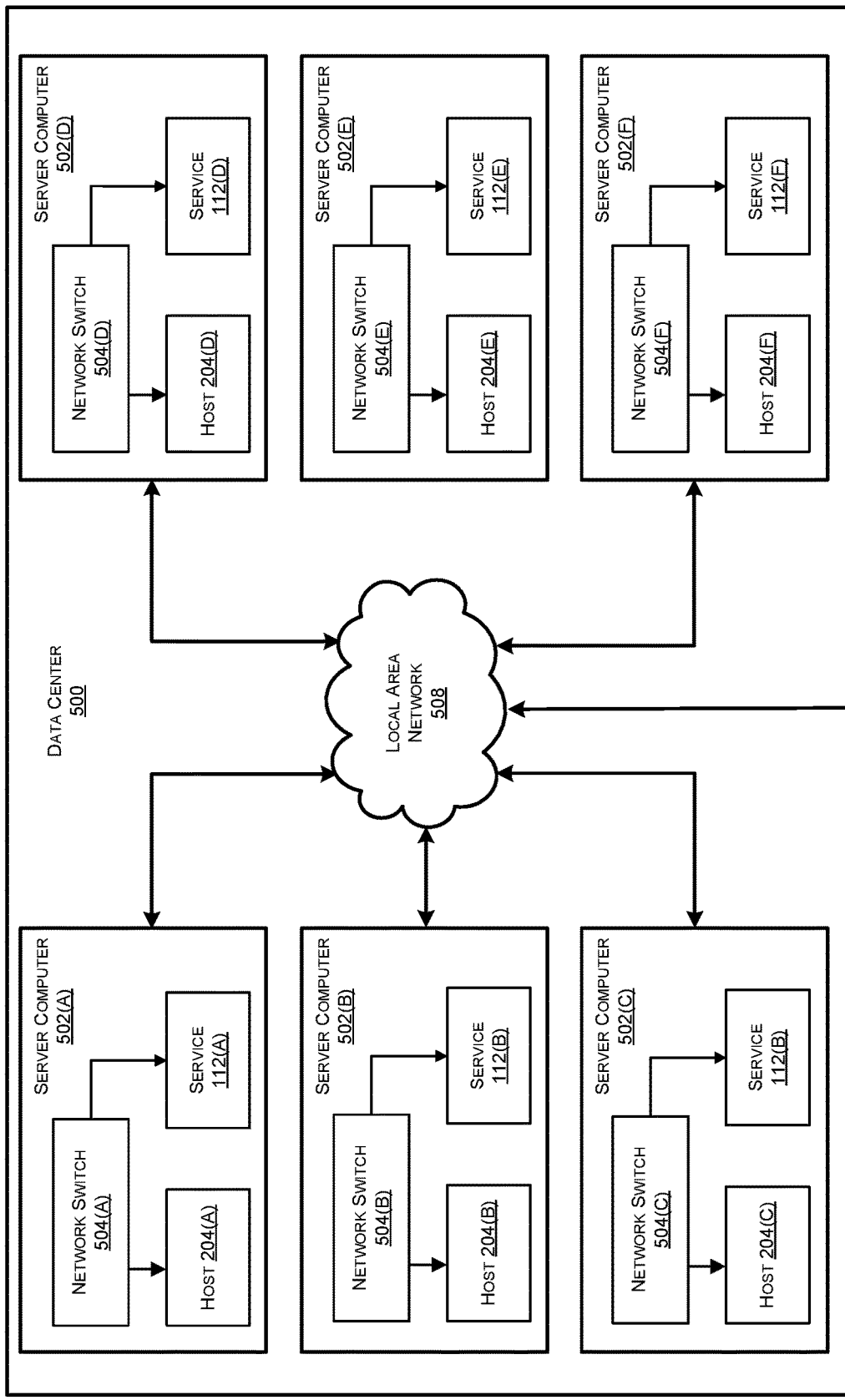
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502E (which might be referred to herein singularly as "a server computer 502" or in the plural as "the server computers 502") for providing computing resources. In some examples, the server computers 502 may include, or correspond to, the servers described herein with respect to FIG. 1.

The server computers 502 can be standard tower, rack-mount, or blade server computers configured appropriately for providing the computing resources described herein. As mentioned above, the computing resources provided by the data center network fabric 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502E in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more network switch(es) 504, the service(s) 112, and/or the host(s) 204, provisioned across a set or cluster of servers 502.

In some instances, the data center network fabric 102 may provide computing resources, like application containers, VM instances, and storage, on a permanent or an as-needed basis. Among other types of functionality, the computing resources provided by the data center network fabric 102 may be utilized to implement the various services described above. The computing resources provided by the data center network fabric 102 can include various types of computing resources, such as data processing resources like application containers and VM instances, data storage resources, networking resources, data communication resources, network services, and the like.

Each type of computing resource provided by the data center network fabric 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the data center network fabric 102 may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 5.

Figure 6:
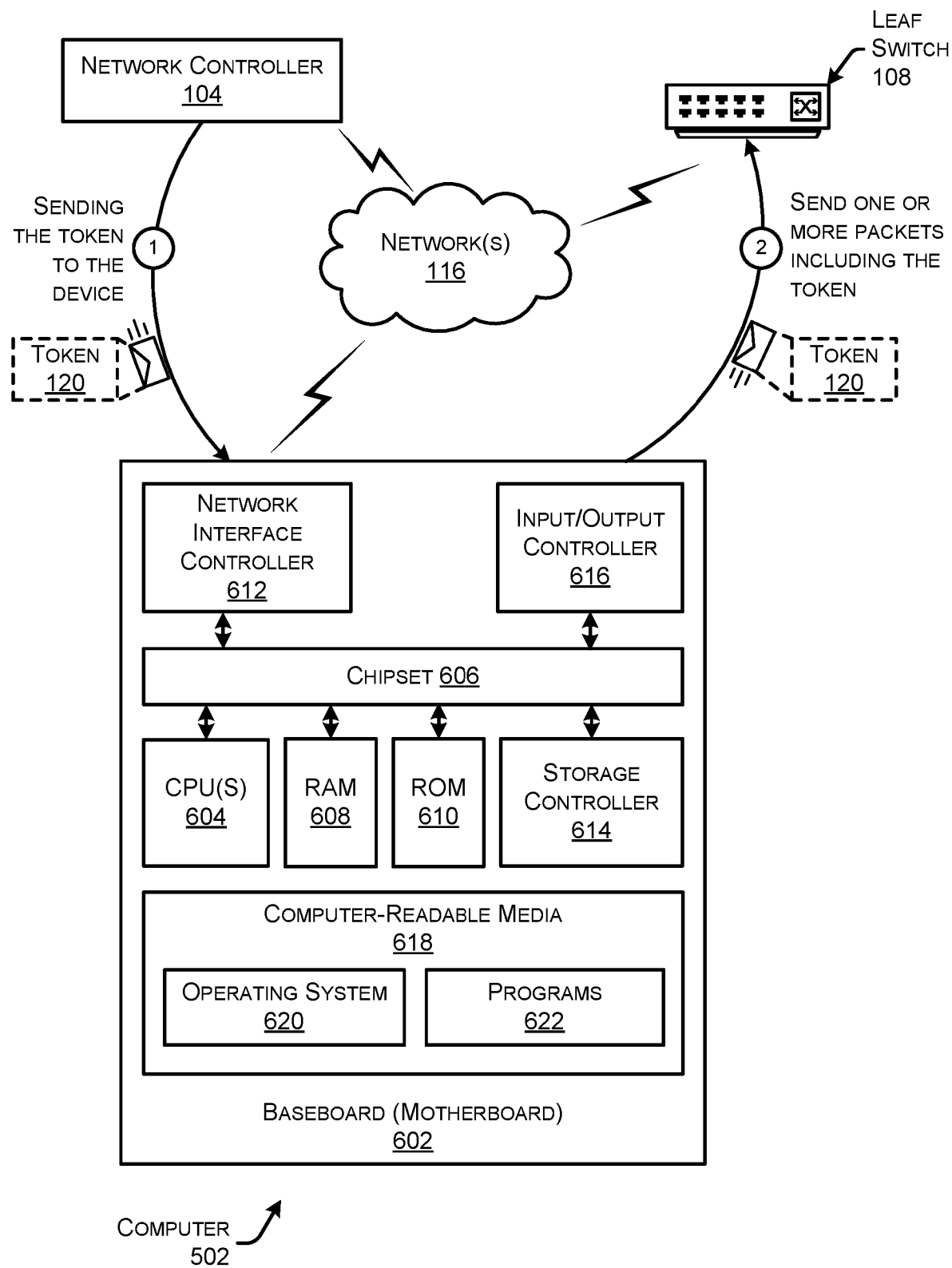
FIG. 6 is a computer architecture diagram showing an illustrative computer hardware architecture for implementing a server device that can be utilized to implement aspects of the various technologies presented herein.

FIG. 6 shows an example computer architecture for a computing device (or network switch) 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 502 may, in some examples, correspond to a physical server 116 described herein with respect to FIG. 1.

The computing device 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 502. The chipset 606 can further provide an interface to a computer-readable storage medium such as a read-only memory ("ROM") 610 or non-volatile RAM ("NVRAM") for storing basic routines that help to startup the computing device 502 and to transfer information between the various components and devices. The ROM 610 or NVRAM can also store other software components necessary for the operation of the computing device 502 in accordance with the configurations described herein.

The computing device 502 can operate in a networked environment using logical connections to remote computing devices and computer systems through a network, such as the network 116. The chipset 606 can include functionality for providing network connectivity through a NIC 612, such as a gigabit Ethernet adapter. The NIC 612 is capable of connecting the computing device 502 to other computing devices over the network 116. It should be appreciated that multiple NICs 612 can be present in the computing device 502, connecting the computer to other types of networks and remote computer systems.

The computing device 502 can be connected to a storage device 618 that provides non-volatile storage for the computing device 502. The storage device 618 can store an operating system 620, programs 622, and data, which have been described in greater detail herein. The storage device 618 can be connected to the computing device 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 502 can further read information from the storage device 618 by detecting the physical states or characteristics of one or more particular locations within the physical storage units.

In addition to the mass storage device 618 described above, the computing device 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 502. In some examples, the operations performed by the data center network fabric 102, and or any components included therein, may be supported by one or more devices similar to computing device 502. Stated otherwise, some or all of the operations performed by the data center network fabric 102, and or any components included therein, may be performed by one or more computing device 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 502. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 618 can store other system or application programs and data utilized by the computing device 502.

In one embodiment, the storage device 618 or other computer-readable storage media is encoded with computer-executable instructions which, when loaded into the computing device 502, transform the computer from a general-purpose computing system into a special-purpose computer capable of implementing the embodiments described herein. These computer-executable instructions transform the computing device 502 by specifying how the CPUs 604 transition between states, as described above. According to one embodiment, the computing device 502 has access to computer-readable storage media storing computer-executable instructions which, when executed by the computing device 502, perform the various processes described above with regard to FIGS. 1-4. The computing device 502 can also include computer-readable storage media having instructions stored thereupon for performing any of the other computer-implemented operations described herein.

The computing device 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 502 might not include all of the components shown in FIG. 5, can include other components that are not explicitly shown in FIG. 5, or might utilize an architecture completely different than that shown in FIG. 5.

The server computer 502 may be configured to communicate with the network controller 104 and/or one or more leaf switches 108. At "1," the server computer 502 and/or an associated leaf switch 108 may receive a token representing a validated authorization to communicate on an address in the data center network fabric. At "2," the server computer 502 may send one or more packets including the token to an associated leaf switch 108. The leaf switch 108 may then validate the token, and the server computer 502 may then be allowed to communicate data on the address.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
preventing a first server among servers in a data center fabric from communicating data from a range of addresses of a switch in the data center fabric, the switch providing switching services to the servers in the data center fabric;
determining that a service has been instantiated on the first server;
receiving a token at the first server, the token comprising a verifiable indication of authorization allowing the service to communicate from the range of addresses in the data center fabric;
sending one or more packets from the first server to the switch, the one or more packets including the token indicating the authorization allowing the service to communicate from the range of addresses;
communicating, by the first server, the data from a first address included in the range of addresses; and preventing the first server from communicating the data from a second address that is outside of the range of addresses.

2. The method of claim 1, further comprising receiving the token from a network controller associated with the data center fabric, wherein the token is signed using a private key of the network controller.

3. The method of claim 1, further comprising signing the token using a private key of the first server to generate a signed token, wherein sending the one or more packets includes sending the signed token.

4. The method of claim 1, further comprising:
determining, by the first server, that the range of addresses is to be migrated to at least one of a different device or a different service;
signing, by the first server, an indication that the range of addresses is to be migrated to at least one of the different device or the different service; and
sending the indication into the data center fabric.

5. The method of claim 1, further comprising:
determining, by the first server, that the range of addresses is to be migrated to at least one of a different device or a different service;
signing, by the first server, an indication that the range of addresses is to be migrated to at least one of the different device or the different service; and
sending the token to at least one of the different device or the different service.

6. The method of claim 5, further comprising sending, to one or more devices associated with the data center fabric, an indication that the authorization to communicate from the range of addresses has been transferred to at least one of the different device or the different service.

7. The method of claim 1, wherein the first address comprises at least one of an internet protocol (IP) address or a media access control (MAC) address.

8. A system comprising:
one or more processors; and
one or more non-transitory computer-readable media storing computer-executable instructions that, when executed by the one or more processors, cause the one or more processors to perform operations comprising:
preventing a first server among servers in a data center fabric from communicating data from a range of addresses of a switch in the data center fabric, the switch providing switching services to the servers in the data center fabric;
determining that a service has been instantiated on the first server;
receiving a token at the first server, the token comprising a verifiable indication of authorization allowing the service to communicate from a range of addresses in the data center fabric;

sending one or more packets from the first server to the switch in the data center fabric, the one or more packets including the token indicating the authorization allowing the service to communicate from the range of addresses;

communicating the data from a first address included in the range of addresses by the server; and preventing the data from being communicated from a second address that is outside of the range of addresses.

9. The system of claim 8, the operations further comprising receiving the token from a network controller associated with the data center fabric, wherein the token is signed using a private key of the network controller.

10. The system of claim 8, the operations further comprising signing the token using a private key of the first server to generate a signed token, wherein sending the one or more packets includes sending the signed token.

11. The system of claim 8, wherein the first address comprises at least one of an internet protocol (IP) address or a media access control (MAC) address.

12. The system of claim 8, the operations further comprising:
determining, by the first server, that the range of addresses is to be migrated to at least one of a different device or a different service;
signing, by the first server, an indication that the range of addresses is to be migrated to at least one of the different device or the different service; and
sending the indication into the data center fabric.

13. The system of claim 8, the operations further comprising:
determining, by the first server, that the range of addresses is to be migrated to at least one of a different device or a different service;
signing, by the first server, an indication that the range of addresses is to be migrated to at least one of the different device or the different service; and
sending the token to at least one of the different device or the different service.

14. The system of claim 13, the operations further comprising sending, to one or more devices associated with the data center fabric, an indication that the authorization to communicate from the range of addresses has been transferred to at least one of the different device or the different service.

15. A method comprising:
allowing, by a network controller associated with a data center fabric, a switch in the data center fabric to provide switching services to servers in the data center fabric;
preventing, by the network controller, a first server in the data center fabric from communicating data from a range of addresses in the data center fabric;
determining, by the network controller associated with the data center fabric, that a service executing on the first server in the data center fabric is requesting to communicate from the range of addresses in the data center fabric;
signing a token indicating authorization allowing the service to communicate from the range of addresses; and
sending the token to the first server, the token being utilized by a switch in the data center fabric to (i) communicate the data from the first server from a first address included in the range of addresses on behalf of the service and (ii) prevent the service from communicating data from the first server from a second address that is outside of the range of addresses.

16. The method of claim 15, wherein an address included in the range of addresses comprises at least one of an internet protocol (IP) address or a media access control (MAC) address.

17. The method of claim 15, further comprising: receiving a request from the first server to transfer the authorization to communicate on the range of addresses to an additional second server in the data center fabric; signing an additional token indicating authorization to communicate from the range of addresses; and sending the additional token to the additional second server.

18. The method of claim 15, wherein: receiving a request from the first server to transfer the authorization to communicate from the range of addresses to an additional a second server in the data center fabric; and sending, to one or more of the servers associated with the data center fabric, an indication that the authorization to communicate from the range of addresses is to be transferred from the first server to the additional second server.

19. The method of claim 15, wherein signing the token comprises signing the token using a private key of the network controller.

20. The method of claim 15, further comprising: determining, by the network controller, that the range of addresses is to be migrated to at least one of a different device or a different service; signing, by the network controller, an indication that the range of addresses is to be migrated to at least one of the different device or the different service; sending the indication into the data center fabric; and sending the token to at least one of the different device or the different service.

* * * * *